US011279809B2

(12) United States Patent
Albach et al.

(10) Patent No.: US 11,279,809 B2
(45) Date of Patent: Mar. 22, 2022

(54) PHOSPHINATE AS FLAME-PROOFING ADDITIVE FOR PUR/PIR HARD FOAM MATERIAL

(71) Applicant: Covestro Intellectual Property GmbH & Co. KG, Leverkusen (DE)

(72) Inventors: Rolf Albach, Cologne (DE); Torsten Hagen, Dortmund (DE); Torsten Heinemann, Leichlingen (DE); Nicole Welsch, Rösrath (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/264,432

(22) PCT Filed: Aug. 2, 2019

(86) PCT No.: PCT/EP2019/070896
§ 371 (c)(1),
(2) Date: Jan. 29, 2021

(87) PCT Pub. No.: WO2020/030549
PCT Pub. Date: Feb. 13, 2020

(65) Prior Publication Data
US 2021/0309823 A1 Oct. 7, 2021

(30) Foreign Application Priority Data

Aug. 8, 2018 (EP) ..................... 18187910

(51) Int. Cl.
| C08J 9/14 | (2006.01) |
| C08J 9/00 | (2006.01) |
| C08G 18/16 | (2006.01) |
| C08G 18/22 | (2006.01) |
| C08G 18/42 | (2006.01) |
| C08G 18/76 | (2006.01) |
| C08K 3/32 | (2006.01) |
| C08K 5/5333 | (2006.01) |
| C08K 13/02 | (2006.01) |
| C09K 21/04 | (2006.01) |
| C09K 21/12 | (2006.01) |

(52) U.S. Cl.
CPC .......... *C08J 9/0038* (2013.01); *C08G 18/161* (2013.01); *C08G 18/168* (2013.01); *C08G 18/225* (2013.01); *C08G 18/425* (2013.01); *C08G 18/7671* (2013.01); *C08J 9/141* (2013.01); *C08K 3/32* (2013.01); *C08K 5/5333* (2013.01); *C08K 13/02* (2013.01); *C09K 21/04* (2013.01); *C09K 21/12* (2013.01); *C08G 2110/0025* (2021.01); *C08G 2330/00* (2013.01); *C08J 2201/022* (2013.01); *C08J 2203/14* (2013.01); *C08J 2205/10* (2013.01); *C08J 2375/06* (2013.01); *C08K 2201/005* (2013.01); *C08K 2201/014* (2013.01)

(58) Field of Classification Search
CPC .. G08G 18/161; G08G 18/168; G08G 18/225; G08G 18/425; G08G 18/7671; G08G 2110/0025; G08G 2330/00; C08J 9/0038; C08J 9/141; C08J 2201/022; C08J 2203/14; C08J 2205/10; C08J 2375/06; C08K 3/32; C08K 5/5333; C08K 13/02; C08K 2201/005; C08K 2201/014; C09K 21/04; C09K 21/12
See application file for complete search history.

(56) References Cited

U.S. PATENT DOCUMENTS

| 2,764,565 | A | 9/1956 | Hoppe et al. |
| 5,268,393 | A | 12/1993 | Blount |
| 5,470,891 | A | 11/1995 | Green et al. |
| 6,593,385 | B2 | 7/2003 | Witte et al. |
| 6,767,986 | B2 | 7/2004 | Moethrath et al. |
| 9,284,401 | B2 | 3/2016 | Lorenz et al. |
| 2008/0188582 | A1 | 8/2008 | Lehmann et al. |
| 2011/0201716 | A1 | 8/2011 | Gehringer et al. |
| 2014/0066532 | A1 | 3/2014 | Combs et al. |
| 2015/0105484 | A1 | 4/2015 | Sun et al. |
| 2015/0118476 | A1* | 4/2015 | Bertucelli .......... C08G 18/4018 428/304.4 |

(Continued)

FOREIGN PATENT DOCUMENTS

| CN | 105131578 A | 12/2015 |
| CN | 105330818 A | 2/2016 |
| CN | 105505171 A | 4/2016 |
| DE | 4418307 A1 | 11/1995 |
| EP | 0069975 A1 | 1/1983 |
| EP | 2910585 A1 | 8/2015 |
| WO | 2017/089293 A1 | 6/2017 |

OTHER PUBLICATIONS

International Search Report, PCT/EP2019/070896, dated Nov. 14, 2019, Authorized officer: Markus Eigner.

(Continued)

Primary Examiner — John M Cooney
(74) Attorney, Agent, or Firm — Donald R. Palladino

(57) ABSTRACT

The invention relates to flame-proofed polyurethane hard foam material or polyurethane/polyisocyanurate hard foam material (designated below individually or jointly also as "PUR/PIR hard foam material") comprising phosphinates (also hypophosphite), and to a method for producing PUR/PIR hard foam materials through the implementation of a reaction mixture containing A1 an isocyanate-reactive component, A2 propellant, A3 catalyst, A4 optionally additive, A5 flame-proofing agent, B an isocyanate component, characterised in that the flame-proofing agent A5 contains a phosphine according to the formula $(I) M[(R)_2 PO_2]_n$, where R=in each case stands for H, C1- to C4-(hydroxy-)alkyl group or benzyl group, M=an element of the main groups 1 to 3, wherein hydrogen is excepted, and n=the number of the main group of M, and the proportion of the phosphine according to the formula (I) is 0.1 to 15 wt %, based on the total mass of components A1 to A5.

16 Claims, No Drawings

(56) References Cited

U.S. PATENT DOCUMENTS

| | | | | |
|---|---|---|---|---|
| 2015/0322195 | A1* | 11/2015 | Makida | C08J 9/0038 521/103 |
| 2016/0251491 | A1* | 9/2016 | Okada | C08G 18/1808 252/62 |

OTHER PUBLICATIONS

"Oligo-Polyols for Elastic Polyurethanes" in Chemistry and Technology of Polyols for Polyurethanes by Mihail Ionescu, Chapter 4, 2005, pp. 55-166.

"Polyester Polyols for Elastic Polyurethanes" in Chemistry and Technology of Polyols for Polyurethanes by Mihail Ionescu, Chapter 8, 2005, pp. 263-294.

"Polyester Polyols for Rigid Polyurethane Foams" in Chemistry and Technology of Polyols for Polyurethanes by Mihail Ionescu, Chapter 16, 2005, pp. 419-434.

"Polyether Polyols for Rigid Polyurethane Foams" in Chemistry and Technology of Polyols for Polyurethanes by Mihail Ionescu, Chapter 13, 2005, pp. 321-370.

Becker et al., "Kunststoff Handbuch", Carl Hanser Verlag, vol. 2, 1983, pp. 104-1-5.

Chen et al., "A review on flame retardant technology in China, Part 1: development of flame retardants," Polym. Adv. Technol., 2010, vol. 21, 2010, pp. 1-26.

Levchik et al., "A Review of Recent Progress in Phosphorus-based Flame Retardants", J. Fire Sci., vol. 24, 2006, pp. 345-364.

Li et al., "Different flame retardancy effects and mechanisms of aluminium phosphinate in PPO, TPU and PP," Polym. Degradation Stab., vol. 105, 2014, pp. 86-95.

Lorenzetti A et al. "Influence of phosphorus valency on thermal behaviour of flame retarded polyurethane foams" Polymer Degradation and Stability, Barking, GB vol. 96, No. 8, May 11, 2011 (May 11, 2011), pp. 1455-1461.

Oertel, "Kunststoff-Handbuch", vol. VII, Carl Hanser Verlag, 3rd edition, Munich 1993, pp. 267.

Quagliano et al., "Structural Nanocomposites, Engineering Materials", Springer Verlag, article "Recent Advances on the Utilization of Nanoclays and Organophosphorus Compounds in Polyurethane Foams for Increasing Flame Retardancy",vol. 1, 2013, pp. 249-258.

Uhlig, "Polyurethan Taschenbuch," Carl Hanser Verlag, 2nd edition, Vienna 2001, pp. 83-102.

\* cited by examiner

PHOSPHINATE AS FLAME-PROOFING ADDITIVE FOR PUR/PIR HARD FOAM MATERIAL

CROSS-REFERENCE TO RELATED APPLICATIONS

This application is a national stage application under 35 U.S.C. § 371 of PCT/EP2019/070896, filed Aug. 2, 2019, which claims the benefit of European Application No. 18187910.7, filed Aug. 8, 2018, each of which is incorporated herein by reference.

FIELD

The present invention relates to flame-retardant rigid polyurethane foams and rigid polyurethane/polyisocyanurate foams (hereinbelow also referred to individually or in common as "rigid PUR/PIR foams") comprising phosphinates and also to processes for the production thereof and to the use of phosphinates as flame retardants in system for producing rigid PUR/PIR foams.

BACKGROUND

Like all organic polymers rigid PUR/PIR foams are flammable, the large surface area per unit mass in foams further reinforcing this behavior. Rigid PUR/PIR foams are often used as insulation materials, for example as insulation in the construction industry. Endowment with flame retardancy through added flame retardants is therefore necessary in many applications of rigid PUR/PIR foams. There are flame retardants which suffocate the flame in the gas phase and there are flame retardants which protect the surface of the polymeric material by favoring charring or forming a glassy coating. Preferably employed flame retardants include halogen-containing compounds and nitrogen and phosphorus compounds. Compounds containing halogens and low-valence phosphorus compounds are typical representatives of flame retardants that suffocate flames. Higher-valence phosphorus compounds are designed to bring about a catalytic cleavage of the polyurethanes in order to form a solid, polyphosphate-containing charred surface. This intumescence layer protects the material from further combustion (G. W. Becker, D. Braun: Polyurethane. In: G. Oertel (Ed.), Kunststoff Handbuch, Munich, Carl Hanser Verlag, 1983, 2, 104-1-5).

However, one disadvantage of the halogen-containing representatives of these classes in particular is that they are toxic and relatively volatile and can therefore migrate out of the foam (J. C. Quagliano, V. M. Wittemberg, I C G Garcia: Recent Advances on the Utilization of Nanoclays and Organophosphorus Compounds in Polyurethane Foams for Increasing Flame Retardancy. In: J. Njuguna (Ed.), Structural Nanocomposites, Engineering Materials, Berlin Heidelberg, Springer Verlag, 2013, 1, 249-258) and that the use thereof results in the formation of corrosive hydrohalic acid in the combustion process.

The increasing prevalence of organic halogen compounds which in some cases have health-hazardous effects in the environment has shifted interest to halogen-free alternatives, for example to halogen-free phosphate esters and phosphite esters (S. V. Levchik, E. D. Weil: A Review of Recent Progress in Phosphorus-based Flame Retardants, J. Fire Sci., 2006, 24, 345-364) and to red phosphorus.

Most widespread are PUR and PIR foams that have been endowed with flame retardancy with organic phosphates such as tris(2-chlorisopropyl) phosphate (TCPP) and triethyl phosphate (TEP). Organic phosphonate esters such as dimethylpropanephosphonate (DMPP, DE 44 18 307 A1) or diethylethylphosphonate (DEEP, U.S. Pat. No. 5,268,393) and others (WO 2006/108833 A1 and EP 1 142 940 A2) have also been described as halogen-free flame retardants for isocyanate-based rigid foams. Solid ammonium polyphosphate has likewise already been employed as a flame retardant (US 2014/066532 A1 and U.S. Pat. No. 5,470,891).

But these halogen-free alternatives also have disadvantages: They are in some cases sensitive to hydrolysis under the alkaline conditions typical for PUR/PIR foam systems or show inadequate effectiveness. Red phosphorus has disadvantages for example in respect of rapid absorption of moisture and rapid oxidation which leads to a loss of flame retardancy and possibly formation of toxic phosphines and also has a propensity for powder explosions. Red phosphorus is often microencapsulated to overcome these problems. (L. Chen, Y.-Z. Wang: A review on flame retardant technology in China. Part 1: development of flame retardants, Polym. Adv. Technol., 2010, 21, 1-26).

Salts of hypophosphonic acid and of dialkyl hypophosphonic acids have already been described as flame retardants for polyurethane materials. This includes use in paints (CN 105505171 A), cable insulation (CN 105131578 A), thermoplastic polyurethanes (H. Li, N. Ning, L. Zhang, Y. Wang, W. Liang, M. Tian: Different flame retardancy effects and mechanisms of aluminum phosphinate in PPO, TPU and PP, Polym. Degradation. Stab., 2014, 105, 86-95) and also foams.

Thus, EP 0 069 975 A1 finds that phosphinates alone are not suitable as flame retardants for polyurethane foams, but have a synergistic effect with halogen-containing compounds.

The examples of CN 105 330 818 B disclose formulations for the production of polyurethane foams using a flame retardant mixture containing an aluminum phosphinate. However, the proportion of aluminum phosphinate in the examples is outside the claimed range.

SUMMARY

The present invention has for its object to allow production of rigid PUR/PIR foams with halogen-free flame retardants, wherein the rigid PUR/PIR foams exhibit improved flame retardancy.

This object was achieved by the inventive use of phosphinates of formula (I) as flame retardant in the production of rigid PUR/PIR foams. The present invention provides a process for producing rigid PUR/PIR foams by reaction of a reaction mixture containing
  A1 an isocyanate-reactive component
  A2 blowing agent
  A3 catalyst
  A4 optionally additive
  A5 flame retardant
  B an isocyanate component,
characterized in that the flame retardant A5 contains a phosphinate of formula (I)

$$M[(R)_2PO_2]_n \quad\quad (I),$$

wherein
  R represents at each occurrence H, C1- to C4-(hydroxy)alkyl or benzyl,
  M is an element from main groups 1 to 3, with the exception of hydrogen, and
  n is the number of the main group of M,
and
the proportion of the phosphinate of formula (I) is 0.1% to 15% by weight based on the total mass of components A1 to A5.

It has now been found that, surprisingly, the rigid PUR/PIR foams according to the invention containing phosphinate of formula (I) as flame retardant not only have improved fire protection properties but also in a particular embodiment have improved compressive strength and anisotropy of the rigid PUR/PIR foams.

DETAILED DESCRIPTION

Employed as the isocyanate-reactive component A1 is at least one compound selected from the group consisting of polyether polyols, polyester polyols, polyether ester polyols, polycarbonate polyols and polyether-polycarbonate polyols. Polyester polyols and/or polyether polyols are preferred. The isocyanate-reactive component A1 can preferably have a hydroxyl number between 25 to 800 mg KOH/g, in particular 50 to 500 mg KOH/g and particularly preferably 100 to 300 mg KOH/g. The individual polyol component preferably has a number-average molecular weight of 120 g/mol to 6000 g/mol, in particular 400 g/mol to 2000 g/mol and particularly preferably 500 g/mol to 1000 g/mol.

In the context of the present invention the number-average molar mass $M_n$ (also known as molecular weight) is determined by gel permeation chromatography according to DIN 55672-1 (August 2007).

In the case of a single added polyol the OH number (also known as hydroxyl number) specifies the OH number of said polyol. Reported OH numbers for mixtures relate to the number-average OH number of the mixture calculated from the OH numbers of the individual components in their respective molar proportions. The OH number indicates the amount of potassium hydroxide in milligrams which is equivalent to the amount of acetic acid bound by one gram of substance during acetylation. In the context of the present invention the OH number is determined according to the standard DIN 53240-1 (June 2013).

In the context of the present invention "functionality" refers to the theoretical average functionality (number of isocyanate-reactive or polyol-reactive functions in the molecule) calculated from the known input materials and their quantitative ratios.

The equivalent weight specifies the ratio of the number-average molecular mass and the functionality of the isocyanate-reactive component. The reported equivalent weights for mixtures are calculated from equivalent weights of the individual components in their respective molar proportions and relate to the number-average equivalent weight of the mixture.

The polyester polyols of component A1 may be for example polycondensates of polyhydric alcohols, preferably diols, having 2 to 12 carbon atoms, preferably having 2 to 6 carbon atoms, and polycarboxylic acids, for example di-, tri- or even tetracarboxylic acids or hydroxycarboxylic acids or lactones, and it is preferable to employ aromatic dicarboxylic acids or mixtures of aromatic and aliphatic dicarboxylic acids. Also employable for preparing the polyesters instead of the free polycarboxylic acids are the corresponding polycarboxylic anhydrides or corresponding polycarboxylic esters of lower alcohols. It is preferable to use phthalic anhydride, terephthalic acid and/or isophthalic acid.

Contemplated carboxylic acids especially include: succinic acid, glutaric acid, adipic acid, suberic acid, azelaic acid, sebacic acid, decanedicarboxylic acid, tetrahydrophthalic acid, hexahydrophthalic acid, cyclohexanedicarboxylic acid, tetrachlorophthalic acid, itaconic acid, malonic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, trimellitic acid, benzoic acid, trimellitic acid, maleic acid, fumaric acid, phthalic acid, isophthalic acid and terephthalic acid. It is likewise possible to use derivatives of these carboxylic acids, for example dimethyl terephthalate. The carboxylic acids may be used either singly or in admixture. Preferably employed as carboxylic acids are adipic acid, sebacic acid and/or succinic acid, particularly preferably adipic acid and/or succinic acid.

Hydroxycarboxylic acids that may be co-employed as reaction participants in the preparation of a polyester polyol having terminal hydroxyl groups are for example hydroxycaproic acid, hydroxybutyric acid, hydroxydecanoic acid, hydroxystearic acid and the like. Suitable lactones include caprolactone, butyrolactone and homologs.

Also especially useful for preparation of the polyester polyols are bio-based starting materials and/or derivatives thereof, for example castor oil, polyhydroxy fatty acids, ricinoleic acid, hydroxyl-modified oils, grapeseed oil, black cumin oil, pumpkin seed oil, borage seed oil, soybean oil, wheat germ oil, rapeseed oil, sunflower seed oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, fatty acids, hydroxyl-modified and epoxidized fatty acids and fatty acid esters, for example based on myristoleic acid, palmitoleic acid, oleic acid, vaccenic acid, petroselic acid, gadoleic acid, erucic acid, nervonic acid, linoleic acid, alpha- and gamma-linolenic acid, stearidonic acid, arachidonic acid, timnodonic acid, clupanodonic acid and cervonic acid. Esters of ricinoleic acid with polyfunctional alcohols, for example glycerol, are especially preferred. Preference is also given to the use of mixtures of such bio-based acids with other carboxylic acids, for example phthalic acids.

Examples of suitable diols are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate. Preference is given to using ethylene glycol, diethylene glycol, butane-1,4-diol, pentane-1,5-diol, hexane-1,6-diol or mixtures of at least two of the diols mentioned, in particular mixtures of butane-1,4-diol, pentane-1,5-diol and hexane-1,6-diol.

It is additionally also possible to use polyols such as trimethylolpropane, glycerol, erythritol, pentaerythritol, trimethylolbenzene or trishydroxyethyl isocyanurate, wherein glycerol and trimethylolpropane are preferred.

In addition, monohydric alkanols can also be co-used.

Polyether polyols used according to the invention are obtained by preparation methods known to those skilled in the art, such as for example by anionic polymerization of one or more alkylene oxides having 2 to 4 carbon atoms with alkali metal hydroxides, such as sodium or potassium hydroxide, alkali metal alkoxides, such as sodium methoxide, sodium or potassium ethoxide or potassium isopropoxide, or aminic alkoxylation catalysts, such as dimethylethanolamine (DMEOA), imidazole and/or imidazole derivatives, using at least one starter molecule containing 2 to 8, preferably 2 to 6, reactive hydrogen atoms in bonded form.

Suitable alkylene oxides are for example tetrahydrofuran, 1,3-propylene oxide, 1,2- and 2,3-butylene oxide, styrene oxide and preferably ethylene oxide and 1,2-propylene oxide. The alkylene oxides may be used singly, alternately in succession or as mixtures. Preferred alkylene oxides are propylene oxide and ethylene oxide and ethylene oxide is particularly preferred. The alkylene oxides may be reacted in combination with $CO_2$.

Contemplated starter molecules include for example: water, organic dicarboxylic acids, such as succinic acid, adipic acid, phthalic acid and terephthalic acid, aliphatic and aromatic, optionally N-mono-, N,N- and N,N'-dialkyl-substituted diamines having 1 to 4 carbon atoms in the alkyl radical, such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 2,2'-, 2,4'- and 4,4'-diaminodiphenylmethane.

Preference is given to using dihydric or polyhydric alcohols such as ethanediol, propane-1,2- and -1,3-diol, diethylene glycol, dipropylene glycol, butane-1,4-diol, hexane-1,6-diol, triethanolamine, bisphenols, glycerol, trimethylolpropane, pentaerythritol, sorbitol and sucrose.

Polycarbonate polyols that may be used are polycarbonates having hydroxyl groups, for example polycarbonate diols. These are formed in the reaction of carbonic acid derivatives, such as diphenyl carbonate, dimethyl carbonate or phosgene, with polyols, preferably diols.

Examples of such diols are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenols, and lactone-modified diols of the abovementioned type.

Also employable instead of or in addition to pure polycarbonate diols are polyether polycarbonate diols obtainable for example by copolymerization of alkylene oxides, such as for example propylene oxide, with $CO_2$.

Employable polyether ester polyols are compounds containing ether groups, ester groups and OH groups. Organic dicarboxylic acids having up to 12 carbon atoms are suitable for preparing the polyether ester polyols, preferably aliphatic dicarboxylic acids having 4 to 6 carbon atoms or aromatic dicarboxylic acids used singly or in admixture. Examples include suberic acid, azelaic acid, decanedicarboxylic acid, furandicarboxylic acid, maleic acid, malonic acid, phthalic acid, pimelic acid and sebacic acid and in particular glutaric acid, fumaric acid, succinic acid, adipic acid, phthalic acid, terephthalic acid and isoterephthalic acid. In addition to organic dicarboxylic acids, derivatives of these acids can also be used, for example their anhydrides and also their esters and half-esters with low molecular weight monofunctional alcohols having 1 to 4 carbon atoms. The use of proportions of the abovementioned bio-based starting materials, in particular of fatty acids/fatty acid derivatives (oleic acid, soybean oil etc.), is likewise possible and can have advantages, for example in respect of storage stability of the polyol formulation, dimensional stability, fire behavior and compressive strength of the foams.

Polyether polyols obtained by alkoxylation of starter molecules such as polyhydric alcohols are a further component used for preparing polyether ester polyols. The starter molecules are at least difunctional, but may optionally also contain proportions of higher-functional, in particular trifunctional, starter molecules.

Starter molecules include for example diols such as 1,2-ethanediol, 1,3-propanediol, 1,2-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-L5 -pentanediol, 2-butyl-2-ethyl-1,3-propanediol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomeric mixtures of alkylene glycols, such as diethylene glycol. Starter molecules having functionalities other than OH can also be used alone or in a mixture.

In addition to the diols, starter molecules used for preparing the polyethers may also be compounds having more than 2 Zerewitinoff-active hydrogens, particularly having number-average functionalities of 3 to 8, in particular of 3 to 6, for example 1,1,1-trimethylolpropane, triethanolamine, glycerol, sorbitan and pentaerythritol and also triol- or tetraol-started polyethylene oxide polyols.

Polyether ester polyols may also be prepared by the alkoxylation, in particular by ethoxylation and/or propoxylation, of reaction products obtained by the reaction of organic dicarboxylic acids and their derivatives and components with Zerewitinoff-active hydrogens, in particular diols and polyols. Derivatives of these acids that may be employed include for example their anhydrides, for example phthalic anhydride.

Processes for preparing the polyols have been described for example by Ionescu in "Chemistry and Technology of Polyols for Polyurethanes", Rapra Technology Limited, Shawbury 2005, p. 55 ff. (chapt. 4: Oligo-Polyols for Elastic Polyurethanes), p. 263 ff. (chapt. 8: Polyester Polyols for Elastic Polyurethanes) and in particular on p. 321 ff. (chapt. 13: Polyether Polyols for Rigid Polyurethane Foams) and p. 419 ff. (chapt. 16: Polyester Polyols for Rigid Polyurethane Foams). It is also possible to obtain polyester polyols and polyether polyols by glycolysis of suitable polymer recyclates. Suitable polyether polycarbonate polyols and the preparation thereof are described, for example, in EP 2 910 585 A1, [00241]-[0041]. Examples of polycarbonate polyols and the preparation thereof can be found, inter alia, in EP 1 359 177 A1. The preparation of suitable polyether ester polyols has been described, inter alia, in WO 2010/043624 A and in EP 1 923 417 A.

The isocyanate-reactive component A1 may further contain low molecular weight isocyanate-reactive compounds, in particular di- or trifunctional amines and alcohols, particularly preferably diols and/or triols having molar masses $M_n$ of less than 400 g/mol, preferably of 60 to 300 g/mol, for example triethanolamine, diethylene glycol, ethylene glycol and glycerol, may be employed. Provided such low molecular weight isocyanate-reactive compounds are used for producing the rigid polyurethane foams, for example as chain extenders and/or crosslinking agents, these are advantageously employed in an amount of up to 5% by weight based on the total weight of component A1.

In addition to the above-described polyols and isocyanate-reactive compounds the component A1 may contain further isocyanate-reactive compounds, for example graft polyols, polyamines, polyamino alcohols and polythiols. It will be appreciated that the described isocyanate-reactive components also comprise compounds having mixed functionalities.

The component A1 may consist of one or more of the abovementioned isocyanate-reactive components.

Employable blowing agents A2 include physical blowing agents such as for example low-boiling organic compounds, for example, hydrocarbons, halogenated hydrocarbons, ethers, ketones, carboxylic esters or carbonic esters. Organic compounds inert toward the isocyanate component B and having boiling points below 100° C., preferably below 50° C., at atmospheric pressure are suitable in particular. These boiling points have the advantage that the organic compounds evaporate under the influence of the exothermic polyaddition reaction. Examples of such preferably used organic compounds are alkanes, such as heptane, hexane, n-pentane and isopentane, preferably technical grade mixtures of n-pentane and isopentane, n-butane and isobutane and propane, cycloalkanes, such as for example cyclopentane and/or cyclohexane, ethers, such as for example furan, dimethyl ether and diethyl ether, ketones, such as for example acetone and methyl ethyl ketone, alkyl carboxylates, such as for example methyl formate, dimethyl oxalate and ethyl acetate and halogenated hydrocarbons, such as for example methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. Also preferred is the use of (hydro)fluorinated olefins, for example HFO 1233zd(E) (trans-1 -chloro-3,3,3-trifluoro-1-propene) or HFO 1336mzz(Z) (cis-1,1,1,4,4,4-hexafluoro-2-butene) or additives such as FA 188 from 3M (1,1,1,2,3,4,5,5,5-nonafluoro-4-(trifluoromethyl)pent-2-ene). Mixtures of two or more of the recited organic compounds may also be employed. The organic compounds may also be used here in the form of an emulsion of small droplets.

Also employable as blowing agent A2 are chemical blowing agents, such as for example water, carboxylic acid and mixtures thereof. These react with isocyanate groups to form the blowing gas, forming carbon dioxide for example in the case of water and forming carbon dioxide and carbon monoxide for example in the case of formic acid. The carboxylic acid used is preferably at least one compound selected from the group consisting of formic acid, acetic acid, oxalic acid and ricinoleic acid. A particularly preferred chemical blowing agent is water.

Halogenated hydrocarbons are preferably not used as blowing agent.

At least one compound selected from the group consisting of physical and chemical blowing agents is employed as blowing agent A2. Preference is given to using only physical blowing agent.

Employed as catalysts A3 for producing the rigid PUR/PIR foams are compounds which accelerate the reaction of the compounds containing reactive hydrogen atoms, in particular hydroxyl groups, with the isocyanate component B, such as for example tertiary amines or metal salts. The catalyst components may be metered into the reaction mixture or else completely or partially initially charged in the isocyanate-reactive component A1.

Compounds employed are for example tertiary amines, such as triethylamine, tributylamine, dimethylbenzylamine, dicyclohexylmethylamine, dimethylcyclohexylamine, N,N,N',N'-tetramethyldiaminodiethyl ether, bis(dimethylaminopropyl)urea, N-methyl- or N-ethylmorpholine, N-cyclohexylmorpholine, N,N,N',N'-tetramethylethylenediamine, N,N,N,N-tetramethylbutanediamine, N,N,N,N-tetramethylhexane-1,6-diamine, pentamethyldiethylenetriamine, bis[2-(dimethylamino)ethyl]ether, dimethylpiperazine, N-dimethylaminoethylpiperidine, 1,2-dimethylimidazole, 1-azabicyclo[3,3,0]octane, 1,4-diazabicyclo[2,2,2]octane (Dabco) and alkanolamine compounds such as triethanolamine, triisopropanolamine, N-methyl- and N-ethyldiethanolamine, dimethylaminoethanol, 2-(N,N-dimethylaminoethoxy)ethanol, N,N',N"-tris(dialkylaminoalkyl)hexahydrotriazine, for example N,N',N"-tris(dimethylaminopropyl)hexahydrotriazine and triethylenediamine.

Metal salts, for example alkali metal or transition metal salts, may also be used. Transition metal salts used are for example zinc salts, bismuth salts, iron salts, lead salts or preferably tin salts. Examples of transition metal salts used are iron(II) chloride, zinc chloride, lead octoate, tin dioctoate, tin diethylhexoate and dibutyltin dilaurate. The transition metal salt is particularly preferably selected from at least one compound from the group consisting of tin dioctoate, tin diethylhexoate and dibutyltin dilaurate. Examples of alkali metal salts are alkali metal alkoxides such as for example sodium methoxide and potassium isopropoxide, alkali metal carboxylates such as for example potassium acetate, and also alkali metal salts of long-chain fatty acids having 10 to 20 carbon atoms and optionally pendant OH groups. It is preferable to employ one or more alkali metal carboxylates as the alkali metal salt.

Contemplated catalysts A3 further include: amidines, for example 2,3-dimethyl-3,4,5,6-tetrahydropyrimidine, tetraalkylammonium hydroxides, for example tetramethylammonium hydroxide, alkali metal hydroxides, for example sodium hydroxide, and tetraalkylammonium carboxylates or phosphonium carboxylates. Mannich bases and salts of phenols are also suitable catalysts. It is also possible to perform the reactions without catalysis. In this case the catalytic activity of amine-started polyols is utilized.

If a relatively large polyisocyanate excess is used when foaming, contemplated catalysts for the trimerization reaction of the excess NCO groups with one another further include: isocyanurate-forming catalysts, for example ammonium ion salts or alkali metal salts, especially ammonium carboxylates or alkali metal carboxylates, alone or in combination with tertiary amines. The isocyanurate formation results in particularly flame-retardant PIR foams.

The abovementioned catalysts may be used alone or in combination with one another.

One or more additives may optionally be used as component A4. Examples of component A4 are surface-active substances, foam stabilizers, cell regulators, fillers, dyes, pigments, hydrolysis stabilizers, fungistatic and bacteriostatic substances.

Contemplated surface-active substances include for example compounds that serve to promote the homogenization of the starting substances and are optionally also suitable for regulating the cell structure of the plastics. Examples include emulsifiers, such as the sodium salts of castor oil sulfates or of fatty acids and salts of fatty acids with amines, for example diethylamine oleate, diethanolamine stearate, diethanolamine ricinoleate, salts of sulfonic acids, for example alkali metal or ammonium salts of dodecylbenzenedisulfonic acid or dinaphthylmethanedisulfonic acid and ricinoleic acid; foam stabilizers, such as siloxane oxyalkylene mixed polymers and other organopolysiloxanes, ethoxylated alkylphenols, ethoxylated fatty alcohols, paraffin oils, castor oil esters or ricinoleic esters, Turkey red oil and peanut oil, and cell regulators, such as paraffins, fatty alcohols and dimethylpolysiloxanes. The above-described oligomeric acrylates having polyoxyalkylene and fluoroalkane radicals as side groups are also suitable for improving emulsifying action, cell structure and/or stabilization of the foam.

Fillers, in particular reinforcing fillers, include the customary organic and inorganic fillers, reinforcers, weighting agents, agents for improving abrasion characteristics in paints, coating agents etc. which are known per se. These especially include for example: inorganic fillers such as siliceous minerals, for example phyllosilicates such as antigorite, serpentine, hornblendes, amphiboles, chrysotile, montmorillonite and talc, metal oxides such as kaolin, aluminum oxides, titanium oxides and iron oxides, metal salts, such as chalk, barite and inorganic pigments such as cadmium sulfide and zinc sulfide and also glass inter alia, and natural and synthetic fibrous minerals such as wollastonite, metal fibers and in particular glass fibers of various lengths which may optionally have been coated with a size. Examples of contemplated organic fillers include: carbon, melamine, colophony, cyclopentadienyl resins and graft polymers and also cellulose fibers, polyamide fibers, polyacrylonitrile fibers, polyurethane fibers and polyester fibers based on aromatic and/or aliphatic dicarboxylic esters and carbon fibers.

According to the invention the flame retardant A5 contains a phosphinate of formula (I)

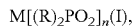

wherein
R represents at each occurrence H, C1- to C4-(hydroxy)alkyl or benzyl,
M is an element from main groups 1 to 3, with the exception of hydrogen, and
n is the number of the main group of M,
and
the proportion of the phosphinate of formula (I) is 0.1% to 15% by weight based on the total mass of components A1 to A5.

The phosphinate of formula (I) may be employed in the reaction mixture as a solid or as an aqueous or glycolic solution, preferably as an aqueous solution. The phosphinate of formula (I) may be employed with a particle diameter $d_{50}$ of less than 50.0 μm, preferably less than 25.0 μm, particularly preferably less than 10.0 μm and very particularly preferably less than 5.0 μm. The particle diameter $d_{50}$ is the particle diameter where 50% of the particles have a diameter smaller than the stated value. When the phosphinate of formula (I) is used as a solution the solution preferably contains at least 10% by weight, particularly preferably 10% to 60% by weight, especially preferably 15% to 40% by weight, of the phosphinate of formula (I)

Group R of the phosphinate of formula (I) represents at each occurrence hydrogen, C1- to C4-(hydroxy)alkyl or benzyl. R preferably represents at each occurrence hydrogen or C1- to C4-(hydroxy)alkyl, particularly preferably hydrogen or C2- to C4-(hydroxy)alkyl. Examples of a C1- to C4-(hydroxy)alkyl group are methyl, ethyl, propyl, butyl, 2-methylpropyl, methoxy, ethoxy or propoxy, wherein ethyl is preferred.

The main group element M of the phosphinate of formula (I) is an element of main groups 1 to 3, preferably 1 and 2. The main group element M of the phosphinate of formula (I) may be, for example, sodium, potassium, magnesium, calcium or aluminum, preferably sodium, magnesium or aluminum, particularly preferably sodium and aluminum, especially preferably sodium.

The phosphinate of formula (I) may be used alone or as a mixture. The proportion of the phosphinate of formula (I) in the flame retardant A5 may be for example 1.0% by weight to 50.0% by weight, preferably 5% by weight to 40.0% by weight and particularly preferably 10.0% by weight to 30.0% by weight in each case based on the total mass of the flame retardant A5. The proportion of phosphinate of formula (I) may preferably be 0.5% by weight to 15.0% by weight, particularly preferably 1.0% by weight to 10.0% by weight, in each case based on the total mass of components A1 to A5.

The phosphinate of formula (I) may be used singly or as a mixture.

Also employable in addition to the phosphinate of formula (I) are further flame retardants such as for example phosphates or phosphonates, for example diethyl ethylphosphonate (DEEP), triethyl phosphate (TEP), triphenyl phosphate (TPP), tricresyl phosphate, diphenyl cresyl phosphate (DPC), dimethyl methylphosphonate (DMMP), diethyl diethanolaminomethylphosphonate, 9,10-dihydro-9-oxa-10-phosphorylphenanthrene-10-oxide (DOPO) and dimethyl propylphosphonate (DMPP). Further suitable flame retardants A5 include for example brominated esters, brominated ethers (Ixol) or brominated alcohols such as dibromoneopentyl alcohol, tribromoneopentyl alcohol, tetrabromophthalate diol, and also chlorinated phosphates such as tris(2-chloroethyl) phosphate, tris(2-chloropropyl) phosphate (TCPP), tris(1,3-dichloropropyl) phosphate, tris(2,3-dibromopropyl) phosphate, tetrakis(2-chloroethyl) ethylenediphosphate and also commercially available halogen-containing flame-retardant polyols. Diphenyl cresyl phosphate, triethyl phosphate and bisphenol A bis(diphenyl phosphate) are preferred. It is particularly preferable when no halogen-containing flame retardant is employed.

Contemplated suitable isocyanate components B are for example polyisocyanates, i.e. isocyanates having an NCO functionality of at least 2. Examples of such suitable polyisocyanates include 1,4-butylene diisocyanate, 1,5-pentanediisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or their mixtures of any desired isomer content, 1,4-cyclohexylene diisocyanate, 1,4-phenylene diisocyanate, 2,4- and/or 2,6-tolylene diisocyanate (TDI), 1,5-naphthylene diisocyanate, 2,2'- and/or 2,4'- and/or 4,4'-diphenylmethane diisocyanate (MDI) and/or higher homologs (polymeric MDI), 1,3- and/or 1,4-bis(2-isocyanatoprop-2-yl)benzene (TMXDI), 1,3-bis(isocyanatomethyl)benzene (XDI) and also alkyl 2,6-diisocyanatohexanoates (lysine diisocyanates) having C1- to C6-alkyl groups. The isocyanate component B is preferably selected from at least one compound from the group consisting of MDI, polymeric MDI and TDI.

In addition to the abovementioned polyisocyanates, it is also possible to co-use proportions of modified diisocyanates having a uretdione, isocyanurate, urethane, carbodiimide, uretonimine, allophanate, biuret, amide, iminooxadiazinedione and/or oxadiazinetrione structure and also unmodified polyisocyanate having more than 2 NCO groups per molecule, for example 4-isocyanatomethyl-1,8-octane diisocyanate (nonane triisocyanate) or triphenylmethane 4,4',4''-triisocyanate.

Also employable as the isocyanate component B instead of or in addition to the abovementioned polyisocyanates are suitable NCO prepolymers. The prepolymers are preparable by reaction of one or more polyisocyanates with one or more polyols corresponding to the polyols described under the isocyanate-reactive components A1.

The isocyanate index (also known as the index) is to be understood as meaning the quotient of the actually employed amount of substance [mol] of isocyanate groups and the actually employed amount of substance [mol] of isocyanate-reactive groups, multiplied by 100:

index=(moles of isocyanate groups/moles of isocyanate-reactive groups)*100

It is possible that in the reaction mixture the number of NCO groups in the isocyanate and the number of isocyanate-reactive groups result in an index of 90 to 600, preferably between 250 and 450. This index is preferably in a range from 300 to 400 in which a higher proportion of polyisocyanurates (PIR) is present (the rigid foam is referred to as a PIR foam or PUR/PIR foam) and results in a higher flame retardancy of the PUR/PIR foam itself. Another preferred range for the isocyanate index is the range from >90 to <150 (the rigid foam referred to as a polyurethane foam (PUR foam)) in which the PUR/PIR foam tends to have a reduced brittleness for example.

The NCO value (also known as NCO content, isocyanate content) is determined according to EN ISO 11909 (May 2007). Unless otherwise stated values at 25° C. are concerned.

The invention likewise relates to a rigid PUR/PIR foam produced by the process according to the invention.

The rigid PUR/PIR foams according to the invention are produced by one-step processes known to those skilled in the art and in which the reaction components are continuously or discontinuously reacted with one another and then subsequently introduced either manually or with the aid of mechanical equipment in the high-pressure or low-pressure process after discharge onto a conveyor belt or into suitable molds for curing. Examples are described in U.S. Pat. No. 2,764 565, in G. Oertel (ed.) "Kunststoff-Handbuch", Volume VII, Carl Hanser Verlag, 3rd edition, Munich 1993, pages 267 ff., and in K. Uhlig (ed.) "Polyurethan Taschenbuch", Carl Hanser Verlag, 2nd edition, Vienna 2001, pages 83-102.

The rigid PUR/PIR foams according to the invention are preferably used for the production of composite elements. Foaming is typically carried out in continuous or discontinuous fashion against at least one outer layer.

The invention accordingly further provides for the use of a rigid PUR/PIR foam according to the invention as an insulation foam and/or as an adhesion promoter in composite elements, wherein the composite elements comprise a layer comprising a rigid PUR/PIR foam according to the invention and an outer layer. The outer layer is at least partially contacted by a layer comprising the rigid PUR/PIR foam according to the invention. Composite elements of the type of interest here are also known as sandwich elements or insulation panels and are generally used as building elements for soundproofing, insulation, for commercial buildings or for facade construction. The outer layers may be formed for example by rolls of metal or plastics or particleboards of up to 7 mm in thickness depending on the application of the composite elements. The one or two outer layers may in each case be a flexible outer layer, for example made of an aluminum foil, paper, multilayer outer layers made of paper and aluminum or of mineral nonwovens and/or a rigid outer layer, for example made of sheet steel or particleboard.

In a first embodiment the invention relates to a process for producing rigid PUR/PIR foams by reaction of a reaction mixture containing
A1 an isocyanate-reactive component
A2 blowing agent
A3 catalyst
A4 optionally additive
A5 flame retardant
B an isocyanate component,
characterized in that the flame retardant A5 contains a phosphinate of formula (I)

$$M[(R)_2PO_2]_n \qquad (I)$$

wherein
R represents at each occurrence H, C1- to C4-(hydroxy)alkyl or benzyl,
M is an element from main groups 1 to 3, with the exception of hydrogen, and
n is the number of the main group of M,
and
the proportion of the phosphinate of formula (I) is 0.1% to 15% by weight based on the total mass of components A1 to A5.

In a second embodiment the invention relates to a process according to the first embodiment, characterized in that the isocyanate-reactive component A1 contains a polyester polyol.

In a third embodiment the invention relates to a process according to either of embodiments 1 and 2, characterized in that the isocyanate-reactive component A1 contains a polyester polyol having an equivalent weight of 50 g/mol to 2000 g/mol, preferably 100 g/mol to 1000 g/mol, particularly preferably 200 g/mol to 500 g/mol and very particularly preferably 300 g/mol to 450 g/mol.

In a fourth embodiment the invention relates to a process according to any of embodiments 1 to 3, characterized in that the flame retardant A5 contains 1.0% by weight to 50.0% by weight, preferably 5.0% by weight to 40.0% by weight, particularly preferably 10.0% by weight to 30% by weight, in each case based on the total mass of the flame retardant A5, of a phosphinate of formula (I).

In a fifth embodiment the invention relates to a process according to any of embodiments 1 to 4, characterized in that the proportion of phosphinate of formula (I) is 0.5% by weight to 15.0% by weight, particularly preferably 1.0% by weight to 10.0% by weight, in each case based on the total mass of the components A1 to A5.

In a sixth embodiment the invention relates to a process according to any of embodiments 1 to 5, characterized in that the flame retardant A5 contains no halogen-containing flame retardant.

In a seventh embodiment the invention relates to a process according to any of embodiments 1 to 8, characterized in that the flame retardant A5 contains a phosphinate of formula (I), wherein M is an element from main group 1 or 2.

In an eighth embodiment the invention relates to a process according to any of embodiments 1 to 7, characterized in that the flame retardant A5 contains a phosphinate of formula (I), wherein M is selected from the group consisting of sodium, potassium, magnesium, calcium and aluminum, preferably sodium, magnesium and aluminum, particularly preferably sodium and aluminum.

In a ninth embodiment the invention relates to a process according to any of embodiments 1 to 8, characterized in that in addition to a phosphinate of formula (I) the flame retardant A5 contains a flame retardant selected from the group consisting of diphenylcresyl phosphate, triethyl phosphate and bisphenol A bis(diphenylphosphate).

In a tenth embodiment the invention relates to a process according to any of the embodiments 1 to 9, characterized in that a phosphinate of formula (I), wherein R is selected from the group consisting of hydrogen or C1-C4-alkyl, is present.

In an eleventh embodiment the invention relates to a process according to any of the embodiments 1 to 10, characterized in that the flame retardant A5 contains a phosphinate of formula (I) having a particle diameter $d_{50}$ of less than 50.0 µm, preferably less than 25.0 µm, particularly preferably less than 10.0 µm and very particularly preferably less than 5.0 µm.

In a twelfth embodiment the invention relates to a process according to any of embodiments 1 to 11, characterized in that the isocyanate component B is selected from at least one compound from the group consisting of MDI, polymeric MDI and TDI.

In a thirteenth embodiment the invention relates to a rigid PUR/PIR foam obtainable by the process according to any of embodiments 1 to 12.

In a fourteenth embodiment the invention relates to the use of rigid PUR/PIR foams according to the thirteenth embodiment for producing an insulation material.

In a fifteenth embodiment the invention relates to a reaction mixture for producing rigid PUR/PIR foams containing A1 an isocyanate-reactive component
A2 blowing agent
A3 catalyst
A4 optionally additive
A5 flame retardant,
characterized in that the flame retardant A5 contains a phosphinate of formula (I)

$$M[(R)_2PO_2]_n \quad (I),$$

wherein
R represents at each occurrence H, C1- to C4-(hydroxy)alkyl or benzyl,
M is an element from main groups 1 to 3, with the exception of hydrogen, and
n is the number of the main group of M,
and
the proportion of the phosphinate of formula (I) is 0.1% to 15% by weight based on the total mass of components A1 to A5.

In a sixteenth embodiment the invention relates to a process according to the first embodiment, characterized in that the flame retardant A5 contains a phosphinate of formula (I) and a further flame retardant.

In a seventeenth embodiment the invention relates to a process according to the first embodiment, characterized in that the reaction mixture contains A1 a polyester polyol having a number-average molecular weight of 50 g/mol to 2500 g/mol and a hydroxyl number of 50 mg KOH/g to 400 mg KOH/g, A2 blowing agent containing a compound selected from the group consisting of halogen-free chemical blowing agents, halogen-free physical blowing agents and (hydro)fluorinated olefins,
A3 catalyst containing alkali metal carboxylate,
A4 additive containing a foam stabilizer,
A5 flame retardant containing a phosphinate of formula (I),
wherein
R represents H and/or C1- to C4-(hydroxy)alkyl,
M represents sodium, magnesium or aluminum, and
n is the number of the main group of M.
B monomeric and polymeric MDI.

In an eighteenth embodiment the invention relates to a process according to the first embodiment, characterized in that the reaction mixture contains A1 50% by weight to <90% by weight of one or more polyester polyols and 5% by weight to 20% by weight of one or more polyether polyols, in each case based on the total weight of the component A1,
A2 physical blowing agents,
A3 catalyst,
A4 optionally additive,
A5 flame retardant containing a phosphinate of formula (I) and at least one compound selected from the group consisting of diphenyl cresyl phosphate, triethyl phosphate and bisphenol A bis(diphenyl phosphate),
B polymeric isocyanate.

In a nineteenth embodiment the invention relates to a process according to any of embodiments 1 to 12, characterized in that the phosphinate of formula (I) is employed as a solid or as an aqueous or glycolic solution.

In a twentieth embodiment the invention relates to a process according to any of embodiments 1 to 12, characterized in that the blowing agent A2 is selected from one or more compounds from the group consisting of halogen-free chemical blowing agents, halogen-free physical blowing agents and (hydro)fluorinated olefins.

The preferred embodiments may be implemented individually or else in conjunction with one another.

EXAMPLES

| | |
|---|---|
| A1-1 | Polyester polyol composed of terephthalic acid, adipic acid, ethylene glycol and diethylene glycol having an equivalent weight of 384 g/mol |
| A1-2 | Polyester polyol composed of phthalic anhydride, adipic acid, ethylene glycol and diethylene glycol having an equivalent weight of 267 g/mol |
| A1-3 | Polyester polyol composed of adipic acid, ethylene glycol and diethylene glycol having an equivalent weight of 1000 g/mol |
| A1-4 | Reaction product of trimethylolpropane with 9.3 equivalents of ethylene oxide having an equivalent weight of 225 g/mol |
| A1-5 | Polyester polyol composed of phthalic anhydride and diethyleneglycol having an equivalent weight of 240 g/mol |
| A1-6 | Sugar ester DUB SE 11S (Oleochem) |
| A1-7 | Polyglycerol polyricinoleate (Paalsgard ® PGPR 4150, Oleochem) |
| A2-1 | n-Pentane |
| A2-2 | Water |
| A3-1 | 46% by weight solution of a mixture (2.2:1 mol/mol) of potassium acetate and 1,2-bis[2-(2-hydroxyethoxy)ethyl] phthalate in diethylene glycol |
| A3-2 | Mixture of 80% by weight of potassium 2-ethylhexanoate, 13% by weight of potassium acetate and 7% by weight of pentamethyldiethylenetriamine |
| A4-1 | Polyether-modified silicone (Tegostab ® B8443, Evonik) |
| A5-1 | Triethyl phosphate (Levagard ® TEP, Lanxess) |
| A5-2 | Bisphenol A bis(diphenyl phosphate) (Fyroflex ® BDP, ICL Industrial Products) |
| A5-3 | Diphenyl cresyl phosphate |
| A5-4 | $Al[(C_2H_5)_2PO_2]_3$ with a particle size $d^{50}$ = 20 μm Exolit ® OP 1230, Clariant) |
| A5-5 | $Al[(C_2H_5)_2PO_2]_3$ with a particle size $d^{50}$ = 4 μm (Exolit ® OP 935, Clariant) |
| A5-6 | $Na[H_2PO_2]$ (Sigma-Aldrich) |
| A5-7 | Aluminum hydroxide (Martinal ® OL-104C, Martinswerk GmbH) |

-continued

| | |
|---|---|
| A5-8 | Magnesium hydroxide (Vertex ® 100, J. M. Huber Corporation) |
| A5-9 | Ammonium polyphosphate Exolit ® AP422 (Clariant) |
| A5-10 | Sepiolite Adins Clay NC (Tolsa) |
| A5-11 | Sepiolite Adins Clay 20 (Tolsa) |
| A5-12 | Tris(2-chloroisopropyl) phosphate |
| B-1 | Polymeric MDI with a viscosity of 0.7 Pas (at 25° C.) and an NCO content of 31.5% by weight |

Production and Testing of Rigid PUR/PIR Foams

The flame spread of the rigid PUR/PIR foams was measured by edge flaming with the small burner test according to DIN 4102-1 (May 1998) on a sample having dimensions of 18 cm×9 cm×2 cm.

The measurement of the MARHE value (Maximum Average Rate of Heat Emission) was measured according to ISO standard 5660-1 (March 2015) with a "cone calorimeter". The test specimens measuring 1 dm×1 dm×0.3 dm are irradiated for 20 minutes by a heat radiator having an irradiance of 50 kW/m². The determined MARHE value indicates the maximum value of the heat emission rate averaged over the test time.

The compressive strength of the rigid PUR/PIR foams was determined according to DIN EN 826 (May 2013) on test specimens having dimensions of 50 mm×50 mm×50 mm. The compressive strength of the test specimens was measured in the foaming direction and perpendicular to the foaming direction.

Measurement of apparent density was performed according to DIN EN ISO 845 (October 2009).

Based on the polyol components rigid PUR/PIR foams were produced in the laboratory by mixing 0.3 dm³ of a reaction mixture in a paper cup. To this end the flame retardant, the foam stabilizer, catalysts and n-pentane as the blowing agent were added to the respective polyol component and the mixture was briefly stirred. The obtained mixture was mixed with the isocyanate and the reaction mixture was poured into a paper mold (3×3×1 dm³) and reacted therein. The exact formulations of the individual experiments are reported in Tables 1 and 2, as are the results of the physical measurements on the samples obtained.

TABLE 1

| Examples | | 1* | 2 | 3 | 4 | 5 | 6* | 7* |
|---|---|---|---|---|---|---|---|---|
| A1-1 | parts by | 64 | 64 | 64 | 64 | 64 | | |
| A1-2 | parts by | | | | | | 41 | 41 |
| A1-3 | parts by | | | | | | 14.9 | 14.9 |
| A1-4 | parts by | | | | | | 6.4 | 6.4 |
| A2-1 | parts by | 15 | 15 | 15 | 15 | 15 | 16 | 16 |
| A2-2 | parts by | | | | | | 1 | 1 |
| A3-1 | parts by | 7 | 7 | 7 | 7 | 7 | 12.4 | 12.4 |
| A4-1 | parts by | 4 | 4 | 4 | 4 | 4 | 5 | 5 |
| A5-1 | parts by | 12.5 | 10 | 10 | 10 | 10 | | |
| A5-2 | parts by | 12.5 | 10 | 10 | 10 | 10 | | |
| A5-3 | parts by | | | | | | 19.2 | 19.2 |
| A5-4 | parts by | | 5 | | | | 30 | |
| A5-5 | parts by | | | 5 | 12 | | | |
| A5-6 | parts by | | | | | 12 | | |
| A5-7 | parts by | | | | | | | 30 |
| B-1 | parts by | 126 | 126 | 126 | 126 | 126 | 174.9 | 174.9 |
| Index | | 320 | 320 | 320 | 320 | 320 | 320 | 320 |
| Properties | | | | | | | | |
| Apparent density from core of | kg/m³ | 32 | 33 | 33 | 35 | 33 | 34 | 33 |
| Compressive strength in weakest direction | MPa | 0.08 | 0.10 | 0.13 | 0.10 | 0.11 | 0.08 | 0.05 |
| Anisotropy | | 2.9 | 2.3 | 1.3 | 2.0 | 1.9 | 1.9 | 2.4 |
| Cream time | s | 10 | 10 | 8 | 8 | 12 | 22 | 25 |
| Fiber time | s | 50 | 70 | 80 | 40 | 100 | 130 | 130 |
| Rise time | s | 50 | 55 | 50 | 40 | 100 | 100 | 100 |
| Vertical flame spread | cm | 12 | 11 | 11 | 9 | 11 | 16 | 17 |

*comparative example

Table 1 shows the use of phosphinate of formula (I) as a constituent of a flame retardant mixture compared to flame retardant mixtures which are representative of the prior art. The rigid PUR/PIR foams of Examples 2 to 5 exhibit a lower flame spread than the rigid PUR/PIR foam of comparative example 1 and also an improvement in compressive strength and anisotropy, wherein example 3 in particular exhibits a marked improvement in anisotropy. Also compared to a flame retardant mixture containing a solid as the flame retardant (comparative example 7) example 6 containing a phosphinate of formula (I) exhibits a lower flame spread, anisotropy and an improved compressive strength. Examples 2 to 5 in comparison with example 6 further show that the use of an inventive amount of the phosphinate of formula (I) results in an improved flame retardancy and compressive strength.

Table 2 shows the use of phosphinates of formula (I) as the sole flame retardant in the production of rigid PUR/PIR foams compared to a flame retardant employed in the form of a solid. The rigid PUR/PIR foam of Example 8 exhibits better flame retardancy than comparative example 9 on account of a lower MARHE value.

TABLE 2

| Examples | | 8 | 9* |
|---|---|---|---|
| A1-5 | parts by | 100 | 100 |
| A2-1 | parts by | 20.3 | 20.3 |
| A3-2 | parts by | 6.8 | 6.8 |
| A4-1 | parts by | 2.5 | 2.5 |
| A5-4 | parts by | 10 | |
| A5-8 | parts by | | 10 |
| B-1 | parts by | 126.7 | 126.7 |
| Index | | 250 | 250 |
| Properties | | | |
| Apparent density from core of molding | Kg/m$^3$ | 29.0 | 30.8 |
| MARHE | kW/m$^2$ | 173 | 216 |
| Heat emission (peak) [1] | kW/m$^2$ | 204 | 260 |

*comparative example
[1] highest measured value of heat emission when measuring heat emission over 600 seconds according to ISO standard 5660-1 (March 2015).

Table 2 shows the comparison of a rigid PUR/PIR foam comprising a phosphinate of formula (I) as the sole flame retardant (example 8) with a rigid PUR/PIR foam containing a noninventive flame retardant in the form of a solid (example 9). Both the MARHE value and the peak of the heat emission are significantly lower when the inventive flame retardant is used (example 8) than when the noninventive flame retardant is used (example 9).

TABLE 3

| Examples | | 10 | 11 | 12 |
|---|---|---|---|---|
| A1-2 | parts by wt. | 32.1 | 32.1 | 32.1 |
| A1-3 | parts by wt. | 11.7 | 11.7 | 11.7 |
| A1-6 | parts by wt. | 5.0 | 5.0 | |
| A1-7 | parts by wt. | | | 5.0 |
| A2-1 | parts by wt. | 11.2 | 11.2 | 12.2 |
| A3-1 | parts by wt. | 7.2 | 7.2 | 7.2 |
| A5-3 | parts by wt. | 15.0 | 15.0 | 15.0 |
| A5-5 | parts by wt. | 5.0 | 5.0 | 5.0 |
| A5-9 | parts by wt. | 25.0 | 25.0 | 25.0 |
| A5-10 | parts by wt. | 2.0 | | 2.0 |
| A5-11 | parts by wt. | | 2.0 | |
| B-1 | parts by wt. | 122.0 | 122.0 | 147.1 |
| Index | | 320 | 320 | 320 |
| Properties | | | | |
| Cream time | s | 30 | 30 | 30 |
| Fiber time | s | 240 | 180 | 180 |
| Rise time | s | 120 | 120 | 110 |
| Apparent density from core of molding | kg/m$^3$ | 42 | 42 | 42 |
| Open-cell content | % | 9 | 8 | 10 |
| Compressive strength in weakest direction | MPa | 0.10 | 0.11 | 0.11 |
| Vertical flame spread | cm | 13 | 13 | 12 |
| MARHE | kW/m$^2$ | 75 | 69 | 62 |
| Heat emission (peak) [1] | kW/m$^2$ | 118 | 113 | 100 |

[1] highest measured value of heat emission when measuring heat emission over 600 seconds according to ISO standard 5660-1 (March 2015).

Table 3 shows that rigid PUR/PIR foams containing isocyanate-reactive components produced with bio-based starting materials likewise have good flame retardancy properties with the inventive flame retardant.

TABLE 4

| Examples | | 13* | 14 |
|---|---|---|---|
| A1-1 | parts by wt. | 64 | 64 |
| A1-4 | parts by wt. | 5 | 5 |
| A2-1 | parts by wt. | 15 | 15 |
| A3-1 | parts by wt. | 7 | 7 |
| A4-1 | parts by wt. | 4 | 4 |
| A5-1 | parts by wt. | 5 | 5 |
| A5-2 | parts by wt. | | 15 |
| A5-5 | parts by wt. | | 5 |
| A5-12 | parts by wt. | 20 | |
| B-1 | parts by wt. | 173 | 173 |
| Index | | 320 | 320 |
| Properties | | | |
| Chlorine content from flame retardants in A + B | % by weight | 2.2 | |
| Cream time | s | 18 | 20 |
| Rise time | s | 40 | 45 |
| Apparent density from core of molding | kg/m$^3$ | 40 | 38 |
| Open-cell content | % | 18 | 8 |
| Parallel to direction of rise | MPa | 0.15 | 0.33 |
| Perpendicular to direction of rise | MPa | 0.10 | 0.11 |
| Vertical flame spread | cm | 8 | 9 |
| MARHE | kW/m$^2$ | 26 | 29 |
| Heat emission (peak) [1] | kW/m$^2$ | 132 | 138 |

*comparative example
[1] highest measured value of heat emission when measuring heat emission over 600 seconds according to ISO standard 5660-1 (March 2015).

The comparison between example 13, a formulation with a halogenated flame retardant, and example 14 shows that the compressive strength of the rigid PUR/PIR foam comprising the inventive flame retardant is improved compared to the rigid PUR/PIR foam comprising a halogenated flame retardant while simultaneously obtaining good flame retardancy properties.

The invention claimed is:

1. A process for producing rigid PUR/PIR foams, comprising reacting a reaction mixture comprising:
    A1 an isocyanate-reactive component;
    A2 blowing agent;
    A3 catalyst;
    A4 optionally additive;
    A5 flame retardant; and
    B an isocyanate component,
    wherein the flame retardant A5 comprises a phosphinate of formula (I)

$$M[(R)_2PO_2]_n \qquad (I),$$

wherein
        each R independently represents C1- to C4-(hydroxy)alkyl or benzyl,
        M is an element from main groups 1 to 3, with the exception of hydrogen, and
        n is the number of the main group of M,
        and
    wherein the phosphinate of formula (I) is present in an amount of 0.1% to 15% by weight, based on the total mass of components A1 to A5 and in an amount of 5.0% to 40.0% by weight, based on the total weight of flame retardant A5.

2. The process as claimed in claim 1, wherein the isocyanate-reactive component A1 comprises a polyester polyol.

3. The process as claimed in claim 1, wherein the isocyanate-reactive component A1 comprises a polyester polyol having an equivalent weight of 50 g/mol to 2000 g/mol.

4. The process as claimed in claim 1, wherein the phosphinate of formula (I) is present in an amount of 10.0% by weight to 30.0% by weight, based on the total mass of the flame retardant A5.

5. The process as claimed in claim 1, wherein the phosphinate of formula (I) is present in an amount of 0.5% by weight to 15.0% by weight, based on the total mass of the components A1 to A5.

6. The process as claimed in claim 1, wherein the flame retardant A5 contains no halogen-containing flame retardant.

7. The process as claimed in claim 1, wherein M is an element from main group 1 or 2.

8. The process as claimed in claim 1, wherein M is selected from sodium, potassium, magnesium, calcium and aluminum.

9. The process as claimed in claim 1, wherein the flame retardant A5 further comprises diphenylcresyl phosphate, triethyl phosphate, bisphenol A bis(diphenylphosphate) or a mixture thereof.

10. The process as claimed in claim 1, wherein at least one R is hydrogen or C1-C4-alkyl.

11. The process as claimed in claim 1, wherein the phosphinate of formula (I) has a particle diameter $d_{50}$ of less than 50.0 µm.

12. The process as claimed in claim 1, wherein the isocyanate component B comprises MDI, polymeric MDI, TDI, or a mixture thereof.

13. A rigid PUR/PIR foam obtained by the process as claimed in claim 1.

14. An insulation material comprising the rigid PUR/PIR foams as claimed in claim 13.

15. A reaction mixture for producing rigid PUR/PIR foams, comprising:
A1 an isocyanate-reactive component
A2 blowing agent
A3 catalyst
A4 optionally additive
A5 flame retardant,
wherein the flame retardant A5 comprises a phosphinate of formula (I)

$$M[(R)_2PO_2]_n \qquad (I),$$

wherein
each R independently represents C1- to C4-(hydroxy)alkyl or benzyl,
M is an element from main groups 1 to 3, with the exception of hydrogen, and
n is the number of the main group of M,
and
wherein the phosphinate of formula (I) is present in an amount of 0.1% to 15% by weight based on the total mass of components A1 to A5 and in an amount of 5.0% to 40.0% by weight, based on the total weight of flame retardant A5.

16. The reaction mixture of claim 15, wherein the phosphinate of formula (I) is present in an amount of 10.0% to 30.0% by weight, based on the total weight of flame retardant A5.

* * * * *